March 17, 1936.  F. G. SALCEDO  2,033,957
OPTICAL REFLECTION AND SOUND REPRODUCING APPARATUS
Filed Jan. 18, 1933  3 Sheets-Sheet 1
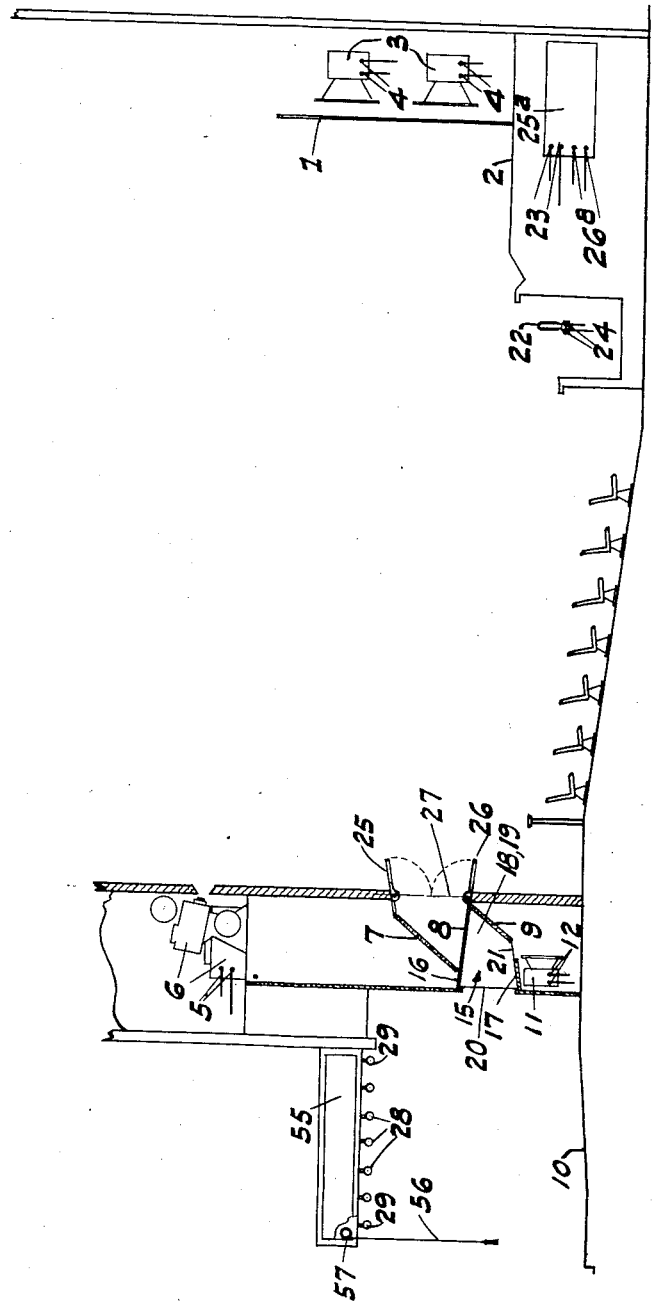
FIG. 1
INVENTOR.
FERDINAND G. SALCEDO
BY
ATTORNEY March 17, 1936.  F. G. SALCEDO  2,033,957
OPTICAL REFLECTION AND SOUND REPRODUCING APPARATUS
Filed Jan. 18, 1933  3 Sheets-Sheet 2

INVENTOR.
FERDINAND G. SALCEDO

March 17, 1936.　　　　F. G. SALCEDO　　　　2,033,957
OPTICAL REFLECTION AND SOUND REPRODUCING APPARATUS
Filed Jan. 18, 1933　　　3 Sheets-Sheet 3

INVENTOR.
FERDINAND G. SALCEDO
BY
ATTORNEY

Patented Mar. 17, 1936

2,033,957

UNITED STATES PATENT OFFICE

2,033,957

OPTICAL REFLECTION AND SOUND REPRODUCING APPARATUS

Ferdinand G. Salcedo, Coronado, Calif., assignor to Consolidated Advertising Corp., Ltd., Los Angeles, Calif.

Application January 18, 1933, Serial No. 652,312

10 Claims. (Cl. 88—16.2)

This invention relates broadly to apparatus for reproducing at will on a subsidiary screen or background a reflection of the picture or image projected on a screen in the usual way, the representation on the subsidiary screen being accompanied by sound in synchronization with that of the picture on the main screen, the mechanism which operates the shutters to disclose the secondary representation with sound accompaniment being automatically actuable from a point within the theatre.

It is intended to use the invention in theatres and possibly other places of public amusement or interest in order to convey to the exterior of the theatre or other building portions of moving pictures, acts, sales talks and the like, and of their sound accompaniments, the portions of the play selected being those in which the greatest interest is centered, in order that people passing the theatre may become interested in the picture being displayed therewithin, and consequently be induced to become patrons of the theatre.

It is an important object of the present invention to improve upon the apparatus described and claimed in my former application which resulted in the issuance of Patent #1,873,790, to me, on August 23rd, 1932.

By the present invention, the reflector or mirror upon which the picture is finally reflected in such a manner as to interest prospective patrons, is provided with a novel hood positioned to focus the image on said mirror with a maximum degree of clearness, and also to exclude outside light rays from the hood as well as noise from the theatre. This hood also serves to intensify the sound waves reproduced.

The mirrors illustrated and hereinafter described are at present deemed preferable, but their design may be varied and that which is reflected by them may constitute scenes other than a picture, within the scope of the appended claims without departing from the spirit of the invention.

The invention also includes a novel arrangement of shutters and shutter-operating means to control the display of the advertising feature of the picture and its sound accompaniment.

Referring to the accompanying drawings:—

Fig. 1 is a semi-structural and a semi-diagrammatic longitudinal cross-sectional view illustrating in a general way the novel combination of screen, motion picture and sound apparatus, as related to a theatre or other building and the interrelationship and means whereby the main image thrown on the screen and accompanied by sound is simultaneously reflected with sound accompaniment, periodically or otherwise as desired, onto a subsidiary reflector arranged at the front of the building.

Figure 2:
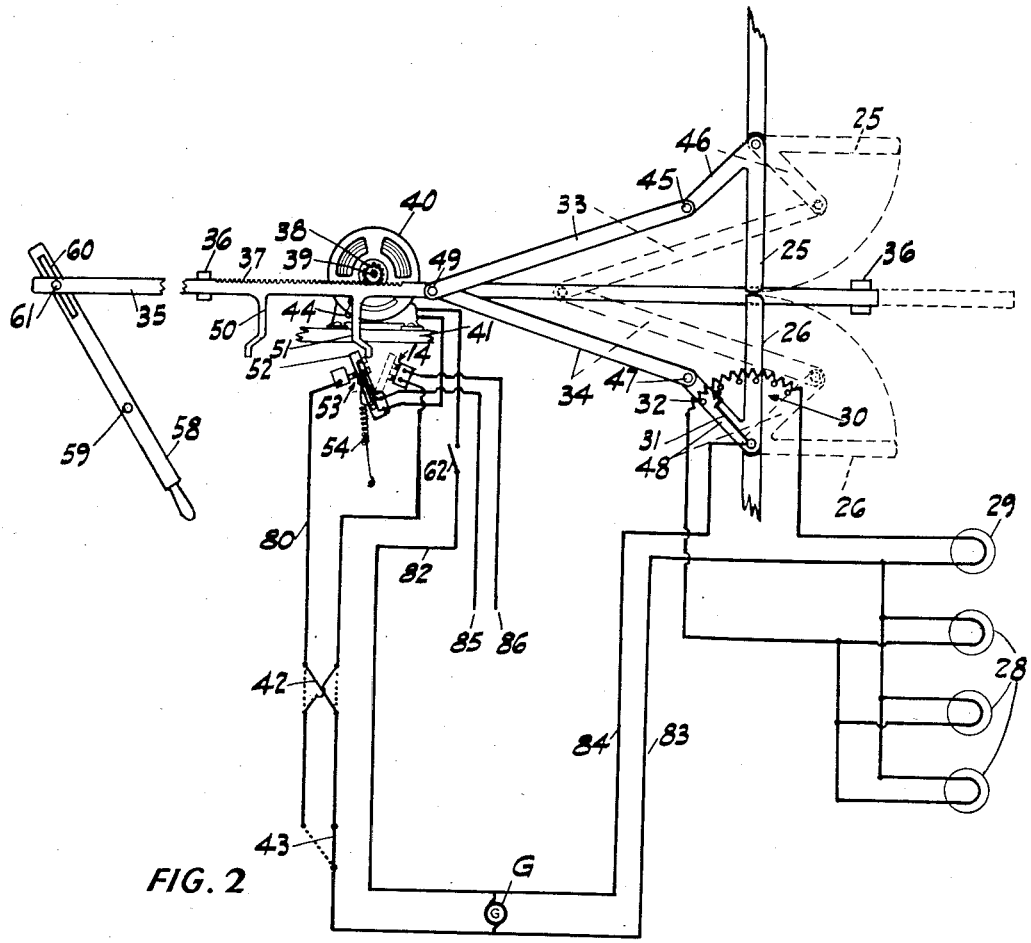
Fig. 2 is a semi-structural, semi-diagrammatic, side elevational view illustrating the manual and automatic control mechanism for operating the shutter.

In Fig. 1, the screen is indicated by the numeral 1, and the stage by the numeral 2. Rearwardly of the screen is mounted the loudspeakers 3, said speakers having their terminals 4 connected by conductors to the terminals 5 of the sound reproducing and projecting apparatus 6.

In carrying out the invention a primary mirror or reflector 7, of any desired size, is positioned so as to reflect downwardly the main image thrown on the screen 1 through the transparency 8 onto the subsidiary screen or secondary reflector 9, from which the reflected images may be observed by passers-by upon the sidewalk 10, or it may be utilized for attracting pedestrians into the building or possibly for advertisement or other purposes.

The loud speaker 11 is concealed from view by a portion of the frame of the reflecting apparatus, and the terminals 12 of the speaker are electrically connected through the medium of a suitable resistance unit 13, (see Fig. 4) and switch 14, to the electric circuit in which the loud speakers 3 are included, in order that the sound produced synchronously with the image on the main screen may likewise be produced synchronously with the reflected image on the subsidiary screen.

Figure 3:
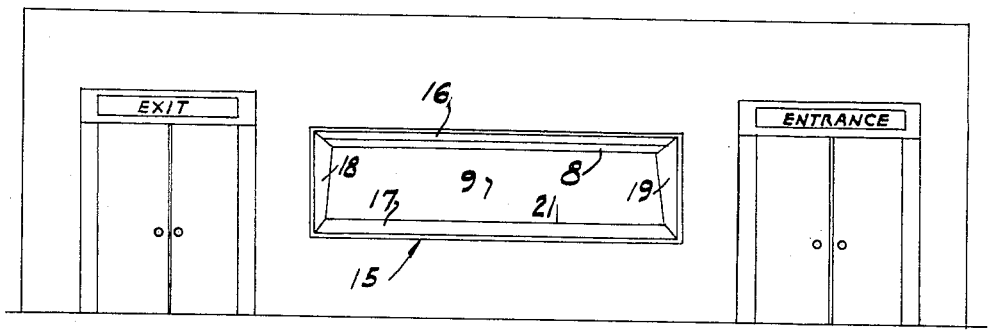
Fig. 3 is an elevational view of the front side of the building.

There is provided a hood 15, Figs. 1 and 3, the top walls being designated by numerals 8 and 16, the bottom wall by numeral 17, and the side walls by numerals 18 and 19. Pedestrians gaze into the opening 20 of the hood in order to observe the image reflected from the main screen, and there is provided an aperture 21 adjacent to the subsidiary screen or mirror 9 through which the sound waves, emanating from the loud speaker 11, pass.

The transparency 8, mounted subjacent to the mirror 7, prevents any sound waves emitted from the speaker 11, or occurring in the front of the theatre, from being heard within the theatre, yet in no way interfering with that which is being reflected from the mirror 7 onto the mirror 9.

Figure 4:
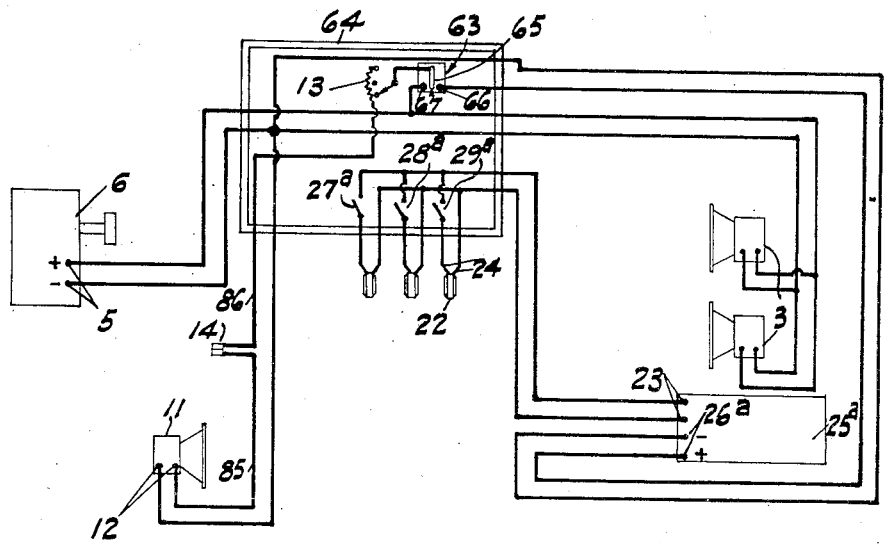
Fig. 4 is a wiring diagram of the sound circuit.

Microphones 22 located within the orchestra pit or in close proximity to the stage 2, as shown in Figs. 1 and 4 are positioned to pick up sounds from vaudeville performances.

The microphones 22 are included in the circuit of which the terminals are designated by numerals 23 and 24. The terminals 23 connect with an amplifier 25a. The terminals 12 of the loud speaker 11 are also connected with the amplifier 25a by terminals 26a.

Control switches 27a, 28a, and 29a, as shown in Fig. 4, are also included in the latter circuit.

Shutters 25 and 26 are provided to open and close the aperture 27 in the wall of the building thru which the image is reflected from the screen 1. Both manual and automatic operation is provided for. In either mode of operation, the opening and closing of the shutters automatically closes and opens the circuit to the speaker 11, and simultaneously controls the energizing and de-energizing of the lamps 28 and 29, thru the rheostat 30, controlled by the shutter 26.

This novel arrangement of manually and automatically controlling the shutters by remote control will now be disclosed with particular reference to Fig. 2.

The shutters 25 and 26 are pivoted at their points of support and it is intended that their opening and closing will be attended with but slight effort, since they are counterbalanced and the weight of the upper shutter 25 in its downward travel will compensate for the weight of the lower shutter 26 in its upward travel, plus any additional friction occurring between the movable contact arm 31 and contact points 32 of the rheostat 30.

The opening and closing of the shutters is effected thru the toggle levers 33 and 34 pivotally connected to the horizontal bar 35 slidingly mounted in the stationary supports or guides 36, said bar constituting the main actuating member. Said bar 35 is provided with a rack 37 in which travels the pinion 38 mounted on the shaft 39 of the motor 40. The motor is mounted upon a base 41 in spaced relation to the bar 35, so that upon energization of the motor from either of the control switches 42 or 43, the action of the teeth of the pinion against the teeth of the rack, will cause the bar 35 to travel from full line position to dotted line position and from dotted line position to full line position, all depending on the position in which the brushes of the motor are set by the brush-shifter 44.

The lever 33 has one end pivotally connected by pin 45 to the operating arm 46 of the shutter 25 and the lever 34 has its corresponding end pivotally connected by pin 47 to the operating arm 48 of the shutter 26. The other ends of said levers 33 and 34 are pivotally connected by pin 49 to the bar 35.

On the underside of the bar 35, in spaced relation with the rack 37, are provided arms 50 and 51, the arm 50 engaging with the handle 52, so as to open the switch 53 and then carry the handle forward until the spring 54 carries it over dead center so as to trip it and close the switch 14. This operation is performed when the bar 35 is reciprocated in a direction toward the screen 1. On the reverse movement of the bar 35 the arm 51 engages with the handle 52 so as to open the switch 14 and carry said handle 52 over dead center again whence the spring 54 again trips the handle 52 so as to close the switch 53.

Upon the opening of the shutter 26 by the mechanism just described, the lamps 28 in the marquise 55 are darkened and the lamps 29 are brightened. This operation is effected thru the operating arms 48 which carries the movable contact arm 31 over the contact points 32 of the rheostat 30. On the reverse movement of the bar 35, which movement closes the shutters, the movable contact arm 31 de-energizes the lamps 29 and brightens the lamps 28.

A curtain 56 is mounted upon a roller 57 in the outer extremity of the marquise 55, which may be lowered so as to partially obstruct light from interfering with a clear reflection of the image from the screen 1 on the subsidiary screen mirror 9.

When the motor 40 is energized, it starts operating under the full load of opening or closing the shutters 25 and 26. However as it picks up momentum the opening or closing of the shutters is accelerated, whereupon as the arms 50 and 51, in either instance of travel, contact with the handle 52, there is inertia stored up in the moving bar 35. This inertia is partly relied upon to shift the brush-shifter 44. This operation will now be described.

Each energization of the motor 40 must be attended by a subsequent shifting of its brushes, which operation will be obvious owing to the fact the rotation of the armature must be reversed in order that the opening and closing of the shutters will be properly regulated.

Therefore at a certain stage of travel of the bar 35, the arms 50 and 51 alternately contact with the brush-shifter 44, so as to reverse the brushes of the motor that upon its subsequent energization, the armature will travel in a different direction.

The momentum stored up in the armature after the arms 50 and 51 contact with the brush-shifter 44 is also partly relied upon to advance the travel of the bar 35, sufficiently at least that the brush-shifter 44 in each instance will be carried to its full limit of travel.

I also provide an auxiliary medium for operating the shutters 25 and 26 thru the agency of the manually operable handle 58 pivoted at 59, there being a slot 60 in the handle in which the pin 61 travels to advance and retract the bar 35 as the handle is oscillated about its pivotal connection. At the time manual operation is desired, the switch 62 is opened.

*Operation*

In the presentation of stage acts, the scene enacted on the stage 2 is reflected on the subsidiary screen 9 similarly to the manner in which the image projected on the screen 1 is reflected on the subsidiary screen 9.

Each presentation has its own sound accompaniment.

In the first instance the sound may be spoken drama or a symphony from the orchestra, or a dance with orchestra accompaniment or the like. This sound produced at or in close proximity to the stage is transmitted exteriorly of the main auditorium of the theatre thru the medium of the microphones 22, amplifying unit 25a, and suitable conductors connecting the terminals 24 of the microphones with the terminals 23 of the amplifier, and the terminals 26a of the amplifier with the terminals 12 of the loud speaker 11, there being provided control switches 27a, 28a and 29a whereby the circuit from the microphone to the amplifier 25a and loud speaker 11 is closed.

In the second instance, the sound or movietones from the sound and picture reproducing apparatus 6, which accompanies the screen presentation is transmitted exteriorly the main auditorium of the theatre thru the medium of suitable conductors, connecting the terminals 5 of the apparatus 6, to the terminals 12 of the loud speaker 11.

The sound circuit from either the apparatus 6 or the microphones 22 is provided with a common control switch 63, of any appropriate type, mounted for instance upon the switch-board 64. There is also an automatically controlled switch 14 common to both of aforesaid circuits as well as a resistance unit 13.

In the operation of automatically producing sound exteriorly of the main auditorium of the theatre from the microphone circuit when the contacts of switch 14 are closed, the switch arm 65 is moved to the right so as to contact with terminal 66 thereby closing the microphone circuit and energizing the loud speaker 11.

For producing sound exteriorly of the main auditorium of the theatre from the movietones, when the contacts of the switch 14 are closed, the switch arm 65 is moved to the left so as to contact the terminal 67, which position also closes the sound circuit so as to energize the loud speaker 11.

When the switch arm 65 is in neutral position as shown in Fig. 4 and the contacts of the switch 14 are closed, the circuit to the loud speaker 11 in both instances is open. Simply moving the switch arm either to the right or the left so as to engage either contact closes one or the other of the sound circuits.

The switch 14, as well as the operation of the shutters 25 and 26, is automatically controlled through the medium of the shutter operating mechanism actuated through the energization of the motor 40 by closing its electrical circuit by remote control switches 42 and 43. The automatic operation of switch 14 is however governed by the opening and closing of the shutters. The shutters may be operated either by the projectionist or box-office attendant by operating switch 42 or 43.

The current from the generator "G" travels thru conductor 80, in which switches 42 and 43 are included, to switch 53 and then to motor 40, the circuit from the motor being completed thru conductor 82.

Closing either of said switches 42 or 43 energizes the motor 40 so as to start the shaft 39 rotating. The shaft in turn rotates the pinion 38. The teeth of the pinion engages the rack 37 of the bar 35 which causes said bar to start moving to the right. As the bar moves to the right, the levers 33 and 34 thru the medium of the arms 46 and 48 start opening the shutters 25 and 26.

Figure 5:
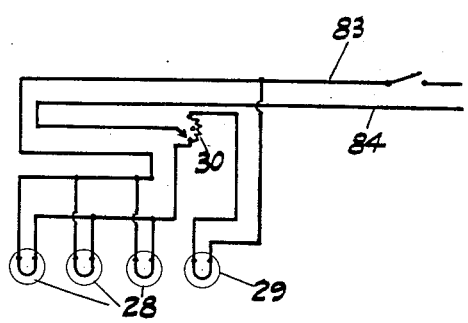
Fig. 5 is a wiring diagram of the light circuit.
Figure 6:
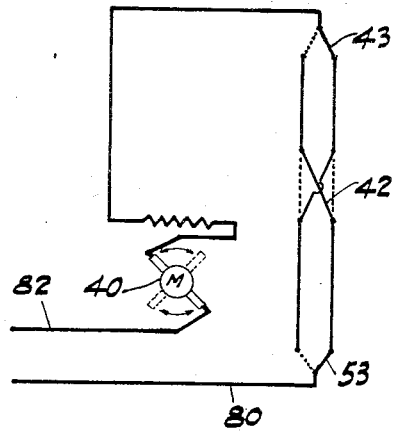
Fig. 6 is a wiring diagram of the motor circuit.

As the arm 48 moves clockwise it also carries the movable contact member 31 of the rheostat 30 over the contact points 32 so as to regulate the voltage in conductors 83 and 84 whereby the lamps 29 are brightened and the lamps 28 are darkened. The circuit in which the lamps are included is shown in Figs. 2 and 5.

As the bar 35 is thus moved forwardly and the motor assumes its load, the armature of the motor as well as the movement of the bar and counterbalanced shutters pick up momentum. At a certain point of travel of the bar 35, the arm 50 engages with the handle 52, so as to open the circuit to the motor. At or about this stage of travel of the bar the arm 50 simultaneously engages with the brush-shifter 44 so as to start resetting the brushes of the motor whereby upon its subsequent energization, the bar will operate in a reverse direction so as to close the shutters.

The inertia stored up in the armature and moving bar prior to the opening of the switch 53 is relied upon to advance the bar and open the shutters and carry the brush-shifter throughout its full limit of travel after the circuit to the motor has been opened.

As the arm 50 continues to carry the handle forwardly over dead center, tension is stored up in the spring 54 so that immediately after the handle reaches its dead center position it is quickly tripped whereby the contacts of switch 14 thru conductors 85 and 86 are closed and the loud speaker 11 is energized.

It will therefore be obvious that after the main switch 63 is once set so as to close either sound circuit the automatic closing of the switch 14 will immediately start energizing the loud speaker 11 and transmit the sound exteriorly of the theatre. Simultaneously with this synchronization of the sound, the shutters will have been completely opened whereby the image from the main screen or an enactment of a scene on the stage is periscopically reproduced on the subsidiary screen.

In closing the shutters, switch 42 or 43 is operated, in which case the motor is again started, this time however operating in a reverse direction due to the resetting of the brushes.

The operation of the motor causes the shutters to start closing, the lamps 29 to start dimming, and the lamps 28 to start brightening. The reverse movement of the bar 35 now causes the arm 51 to engage the handle 52 in a manner as that just previously described, so as to open the circuit in which switch 14 is included. Arm 51 also shifts the brush-shifter 44 and the spring 54 trips the arm 52 so as to close the contacts with switch 53.

This method of automatically opening and closing the shutters and the automatic regulating of the sound circuit, so as to present portions of pictures and stage enactments together with their sound accompaniment for the purpose of interesting spectators exteriorly of the theatre, may be carried on at will indefinitely.

From the foregoing description of the shutter and sound control mechanism it will be obvious how by operating the manually controlled parts of the shutter control mechanism, the same results may be obtained.

I claim:

1. In combination, a theatre having a picture and sound reproduction apparatus, and a main screen located in the theatre oppositely thereto for receiving a picture projected from said apparatus, of a reflector located subjacent to said apparatus and oppositely to said screen for receiving the image produced on said screen and a subsidiary screen in periscopic relation to said reflector for receiving the image reflected onto said reflector from said screen, there being a partition between said reflector and screen and an aperture in said partition through which the image from the main screen is reflected onto said reflector, and there being an outside opening to expose the image reflected on the subsidiary screen exteriorly of the main auditorium of the theatre, a transparency to intercept sound and through which the image from said reflector is reflected onto the subsidiary screen, shutters for opening and closing the aperture in said partition and means to open and close said shutters.

2. In a theatre building having a front and rear wall and a wall forwardly of said front wall forming a street wall along which pedestrians pass, a main screen erected adjacent said rear wall and a projection room and projection apparatus erected between said front wall and said street wall for projecting thru the front wall on to said screen an image from said apparatus, there being an aperture in the front wall opposite to said screen and a mirror mounted adjacent thereto on the side nearest said street wall to reflect downwardly the picture displayed on said screen, a hood between said street wall and said front wall and including a second mirror positioned to receive the image from th other mirror and direct said image forwardly whereby pedestrians in front of the building may view the images on the second mirror, said hood having a transparency formed in a wall thereof thru which the image on one mirror may be reflected on to that of the other mirror, said transparency excluding undesirable outside sounds from the interior of the building, there being an aperture thru the lower portion of said hood, a loud speaker stationed subjacent to said aperture, another loud speaker to produce a sound accompaniment for the image on said screen, and means to provide both of said loud speakers simultaneously with the same sound vibrations.

3. A moving picture theatre comprising an auditorium provided with a stage, projection room and projecting apparatus, a main screen at the stage side of said auditorium whereon to project pictures by said apparatus, a mirror whereon the pictures projected on said main screen are reflectable, a second mirror in periscopic relation to the first said mirror, said second mirror forming a subsidiary screen which is visible exteriorly of the front wall of the theatre building, the picture which is exhibited on the main screen being simultaneously reproduced on said subsidiary screen, a microphone receiver and transmitter arranged to deliver sound from said stage to a point adjacent said subsidiary screen, a shutter for obscuring visibility of the picture on the subsidiary screen at will, and means to operate said shutter, said transmitter having control means operatively connected with said shutter operating means, whereby when the scene is displayed on the main screen its sound accompaniment is heard by the onlookers viewing the picture on the main and subsidiary screens within and without the theatre.

4. In apparatus of the kind described, the combination with the main picture and its sound accompaniment, of an advertising reproduction of said main picture visible to pedestrians in front of the theatre and its sound accompaniment, said advertising reproduction being exhibitable simultaneously with the main picture showing; shutters to obscure visibility of said advertising reproduction at will, means to operate said shutters, and means operatively related to said shutter operating means for controlling the sound accompaniment for the advertising reproduction.

5. In apparatus of the kind described, the combination with the theatre having the usual stage, and reproduction apparatus including a microphone unit and amplifying unit arranged within the theatre adjacent said stage, of another loud speaker unit in circuit with the units aforesaid, means to exhibit to pedestrians exteriorly of said theatre scenes enacted on said stage and to accompany said scenes simultaneously with the sound waves spoken by the enactors and picked up by said microphones, said means comprising a mirror positioned to have reflected thereon the scenes from the stage, and another mirror in periscopic relation to the first said mirror forming a subsidiary screen which is visible exteriorly of the front wall of the theatre, a shutter device for obscuring visibility of the image reflected on the subsidiary screen at will, means to operate said shutter, and means operatively related to said shutter operating means, whereby when the scene from the stage is displayed on said subsidiary screen the sound waves from said microphone unit are synchronously produced by the loud speaker which is in circuit with said microphone unit.

6. In combination, a theatre having a main screen for the projecting of motion pictures thereon, a hood positioned exteriorly the theatre having an outside opening into which pedestrians outside of said theatre may gaze, and an inside opening communicating with the interior of said theatre, a mirror in said hood adjacent the inside opening thereof and directed towards said screen for receiving a reflection of the picture projected on said screen, and a subsidiary screen in said hood in periscopic relation to said mirror on which the picture from the main screen thru the medium of said mirror is reflectable.

7. In a theatre building having a front and rear wall, and a wall forwardly of said front wall forming a street wall along which pedestrians pass, a main screen erected adjacent said rear wall, and a projection room and projection apparatus erected between said front wall and said street wall for projecting thru the front wall on to said screen an image from said apparatus, there being an aperture in the front wall opposite said screen, and a mirror mounted adjacent said aperture on the side nearest said street wall to reflect the picture displayed on said screen, a second mirror positioned to receive the image from the other mirror, and direct said image forwardly whereby pedestrians in front of the building may view the images on the second mirror, a loud speaker stationed adjacent said front wall and street wall, another loud speaker to produce a sound accompaniment for the image on said main screen, and means to provide both of said loud speakers simultaneously with the same sound vibrations.

8. In a theatre building having a front and rear wall and a wall forwardly of said front wall forming a street wall along which pedestrians pass, a main screen erected adjacent said rear wall, and a projection room and projection apparatus erected between said front wall and said street wall for projecting thru the front wall on to said screen an image from said apparatus, there being an aperture in the front wall opposite said screen and a mirror mounted adjacent said aperture on the side nearest said street wall to reflect the picture displayed on said screen, a hood between said street wall and said front wall, and including a second mirror positioned to receive the image from the other mirror and direct said image forwardly, whereby pedestrians in front of the building may view the images on the second mirror, there being an aperture in said hood, a loud speaker stationed adjacent said aperture, another loud speaker to produce a sound accompaniment for the image on said screen, and means to provide both of said loud speakers simultaneously with the same sound vibrations.

9. A theatre having a picture and sound retre for receiving a picture projected from said apparatus, a reflector for receiving the image produced on said main screen and a subsidiary screen in periscopic relation to said reflector, a partition between said reflector and main screen, there being an aperture in said partition through which the image from the main screen is reflected on to said reflector, and there being an outside opening to expose the image reflected on the subsidiary screen exteriorly of the theatre, a transparency through which the image from said reflector is reflected on to the subsidiary screen, shutters for opening and closing said aperture, and means to operate said shutters.

10. In combination, a theatre having a main screen for the display of motion pictures thereon for the entertainment of patrons within the theatre, a subsidiary screen remotely situated from said main screen for exhibiting to prospective patrons outside the theatre portions of the picture simultaneously with its display on the main screen, apparatus comprising a reflector and an apertured partition between the reflector and the main screen whereby the picture projected on the main screen is reflected from the main screen to the subsidiary screen, a transparency closing the aperture in the partition, loud speakers stationed adjacent said main screen and subsidiary screen and providing sound accompaniments for the patrons of the theatre and the prospective patrons exterior of the theatre, and means to provide said loud speakers simultaneously with the same sound vibrations.

FERDINAND G. SALCEDO.